(12) United States Patent
McLaughlin

(10) Patent No.: US 7,165,612 B2
(45) Date of Patent: Jan. 23, 2007

(54) IMPACT SENSING SYSTEM AND METHODS

(76) Inventor: Stuart McLaughlin, 428 Cumberland Trail, Conroe, TX (US) 77302

( * ) Notice: Subject to any disclaimer, the term of this patent is extended or adjusted under 35 U.S.C. 154(b) by 0 days.

(21) Appl. No.: 11/312,202

(22) Filed: Dec. 20, 2005

(65) Prior Publication Data

US 2006/0142945 A1  Jun. 29, 2006

Related U.S. Application Data

(60) Provisional application No. 60/639,129, filed on Dec. 23, 2004.

(51) Int. Cl.
*E21B 47/01* (2006.01)
(52) U.S. Cl. .................................. 166/250.01
(58) Field of Classification Search ........... 166/250.01, 166/250.07, 250.13
See application file for complete search history.

(56) References Cited

U.S. PATENT DOCUMENTS

| | | | |
|---|---|---|---|
| 5,741,970 A * | 4/1998 | Rubin ..................... | 73/379.05 |
| 6,739,409 B1 * | 5/2004 | Kruspe et al. ................ | 175/50 |
| 6,984,980 B1 * | 1/2006 | Kruspe et al. .............. | 324/303 |

* cited by examiner

*Primary Examiner*—William Neuder
(74) *Attorney, Agent, or Firm*—Shawn Hunter

(57) ABSTRACT

An impact sensing system for detecting downhole impacts within a toolstring, such as a jarring tool string. The system includes an impact sensing sub that is integrated into the tool string and contains an impact sensor for sensing impacts. Additionally, the sub has means for storing impact-related data and correlating it with time, inclination, and other data.

20 Claims, 3 Drawing Sheets

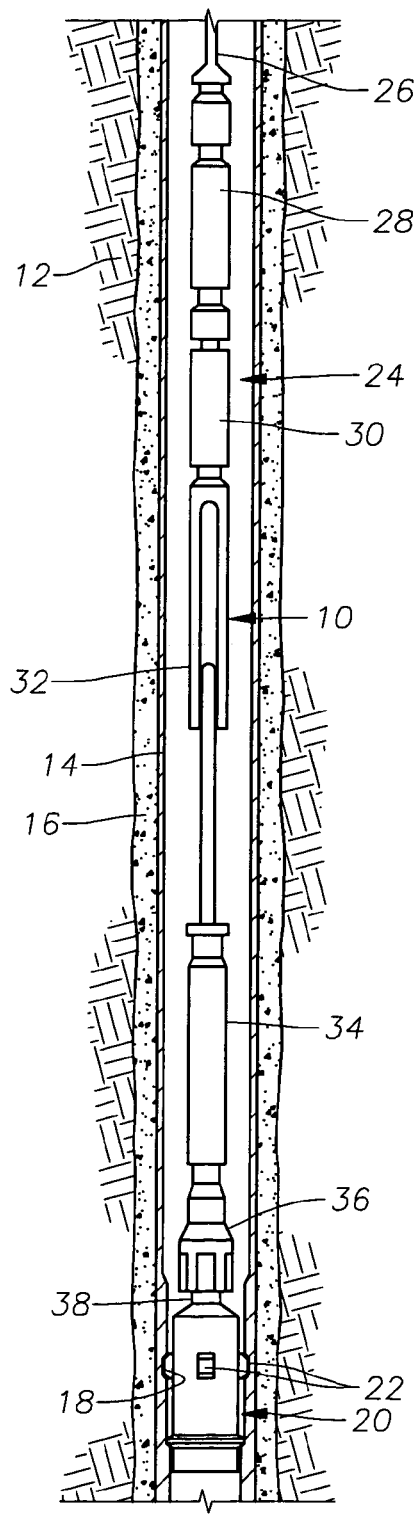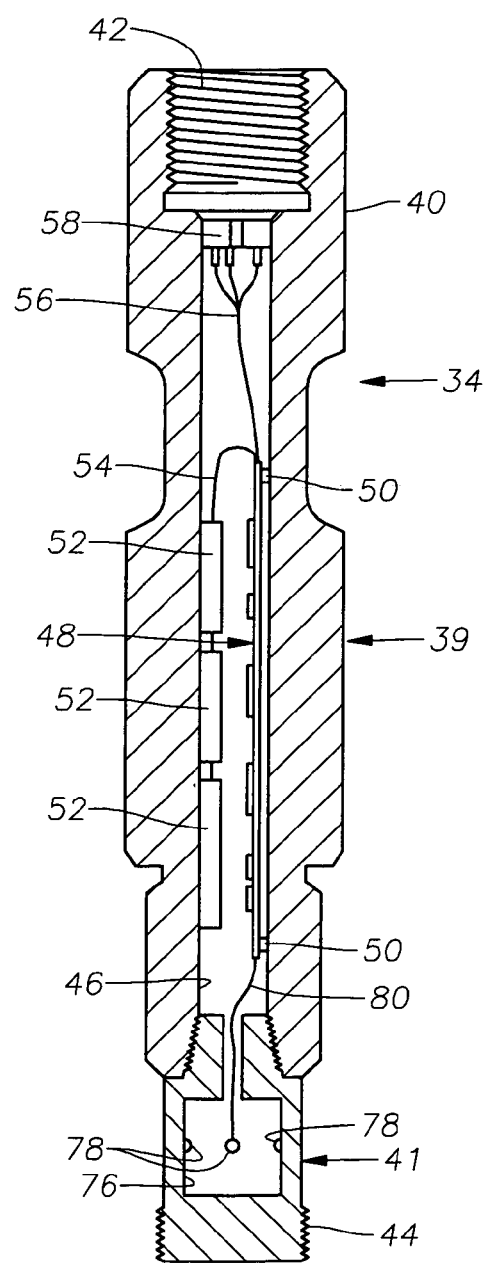
Fig. 1
Fig. 2

IMPACT SENSING SYSTEM AND METHODS

This application claims the priority of U.S. provisional patent application Ser. No. 60/639,129 filed Dec. 23, 2004.

BACKGROUND OF THE INVENTION

1. Field of the Invention

The present invention generally relates to instrumentation for monitoring and recording instrumentation for equipment and well conditions in hydrocarbon wells, water wells, or other well applications. In one aspect, a down hole impact sensing system is disclosed which provides for observing and recording impact loads and hole angles realized by wire line, electric line, coiled tubing, tubing, drill pipe or other tool deployment strings operated "downhole" within a well. In addition, a method of using a downhole impact sensing gyro scope system in well operations is disclosed.

2. Description of the Related Art

Various well operations often require the use of devices which provided an "impact" on a tool string or on a downhole production device. Certain types of downhole tools require the shearing of screws or pins to either set or release a device. For example, a downhole packer or bridge plug run into a well by wireline may require the shearing of screws on the run-in tool in order to set the packer at the desired depth. Shearing of the pins or screws requires that an impact load is delivered to the pins or screws. In other applications, a device may be installed or removed from a production string by use of wireline or coiled tubing. For example, a safety valve or gas lift valve is often installed or removed from the tubing by a wireline-deployed setting or retrieving tool. Retrieval of a safety valve from tubing usually requires the application of a force to the retrieving tool in order to unseat the valve from the tubing.

Typically, a mechanical or hydraulic jarring tool is used to deliver the impact force required for the above operations. However, with known downhole tools, the only indication the operator has on what is occurring down hole is what can be observed on the surface weight indicator which shows the weight on the wireline or coiled tubing string at the surface. However, the information provided by the surface weight indicator is of questionable benefit in determining the events occurring down hole due to many factors but include depth of device from weight indicator, wire stretch, hole deviation, tubing size, friction losses, etc. In general, a surface weight indicator only shows static loads at the surface, as opposed to measuring and recording dynamic loads realized at the depth of the tool. Moreover, any deviations, dog-legs, or other obstructions in the well bore will affect the surface reading.

Information regarding the actual impact realized at the depth of a particular tool can be of assistance to well operations, particularly when difficulties are experience in either setting or retrieving a tool. A record of the impact loads imparted to the tool string may be used to diagnose the difficulty and allow the operator to make changes in tool string design or other operational factors to complete the desired operation. Both the impact load at depth and the hole angle are critical to understanding what the data retrieved means. Surface testing at various angles would allow for a data archive to be held that would be accessed once impact loads and angles were retrieved from the tool. It is at this point that exacting toolstring changes can be made to enable a successful set or retrieve during the next intervention. Well bore deviation is a major factor in friction losses in any deployed toolstring. Wireline toolstring lengths typically range from 15 to 25 ft and as a result friction is unavoidable with hole angle. The greater the hole angle the greater the friction losses both in the toolstring rubbing against the tubing wall and the wireline itself doing the same. The deeper the well the more friction is created.

The present invention is directed to overcoming the problems of the prior art.

SUMMARY OF THE INVENTION

An embodiment of the invention comprises an impact sensing sub with a housing adapted to be disposed within the tool string of either a wireline or coiled tubing system or within a machined pocket interface for drilling bits. The system generally comprises two major components. The first major component is the downhole component, which comprises a printed circuit board assembly ("PCBA") based electronics package, which includes data storage means, real time clock recording, temperature and pressure data, and surface time event correlation. In preferred embodiment, the electronics package includes a inclinometer as well. The downhole component also incorporates a lower force sensor sub which houses a strain gauge sensor which is preferably hard mounted to the inner diameter.

The second major component is the surface component which retrieves the data stored in the data storage memory chip. In currently preferred embodiments, the surface component is a computer. It can also be a stand alone data acquisition unit such as a personal data assistant ("PDA") or simply a CD-ROM software disk that can be loaded and managed on any laptop personal computer that utilizes Microsoft® systems and can read flash software.

In preferred embodiments, the impact sensor sub further comprises a lower mechanical sensor sub with an embedded strain gauge impact sensor bonded to the internal diameter of the lower sub. The electronics package comprises the impact sensor, signal amplifier, microcontroller, temperature gauge, inclinometer for angle detection and memory means disposed within the carrier. The components of the top sub electronics package are shock mounted within the carrier in such as manner that the electronics package can measure impact yet not be damaged as a result of the impact. The impact sensor is preferably hard mounted to a separate end sub in order to record actual forces applied to the system.

The electronics package is programmed at the surface and the impact sensing sub attached within a toolstring for running into a well. The impact sensing sub may be configured such that the operator has access to the electronics package so that the operator may program or download the electronics package without disassembly of the tool string. The lower sensor sub comprises a strain gauge sensor for detecting the shock force. The PCBA in the top sub will generate and amplify the analog signal to enlarge the detected analog signal and compute the signal to engineer units readable once downloaded to Pound (lbs) force, the standard unit of measure for these typical operations. The amplified signal is inputted into a microcontroller which transforms the analog signal into a digital signal. Digital output is provided by the microcontroller to digital storage means, along with a "time stamp" which may be used to correlate the recorded data with events which occur on the surface; for example, the time at which a mechanical or hydraulic jarring tool is activated. The stored data may be downloaded and recovered once the sub is brought back to surface by means of a mechanical single pin jack data probe or a wireless interface such as infra red. The electronics package further comprises a multi-cell lithium battery pack.

The battery system is designed to use minimal lithium content in order to aid transportation on aircraft where lithium content is a 'IATA' hazardous material issue. By utilizing low content lithium systems below 1.0 grams total the system will be hazard free shipping goods.

The battery pack is separated from the PCBA in order to maintain reliability of both the batteries and the PCBA. In the event the PCBA fails to operate, it will not affect the operation of the battery. Similarly if the battery pack fails it will not affect the operation of the PCBA and can be changed out independent of the battery pack. This also allows the electronics package of the impact sensing system to be shipped separately from the battery pack where Lithium content is a freight flight issue. The system will preferably function up to 12 months without service; however this is determined by how much usage the system is exposed to.

The surface component connects to the downhole component for downloading of the recorded data to a computer, handheld processor, laptop, or other data processing device.

BRIEF DESCRIPTION OF THE DRAWINGS

For detailed understanding of the invention, reference is made to the following detailed description of the preferred embodiments, taken in conjunction with the accompanying drawings in which reference characters designate like or similar elements throughout the several figures of the drawings.

FIG. 1 is a side, cross-sectional view of an exemplary wellbore containing a jarring tool arrangement incorporating an impact sensor system constructed in accordance with the present invention.

FIG. 2 is a side, cross-sectional view of an embodiment of the carrier member and electronics package used in the impact sensor system.

DETAILED DESCRIPTION OF THE PREFERRED EMBODIMENTS

Figure 3:
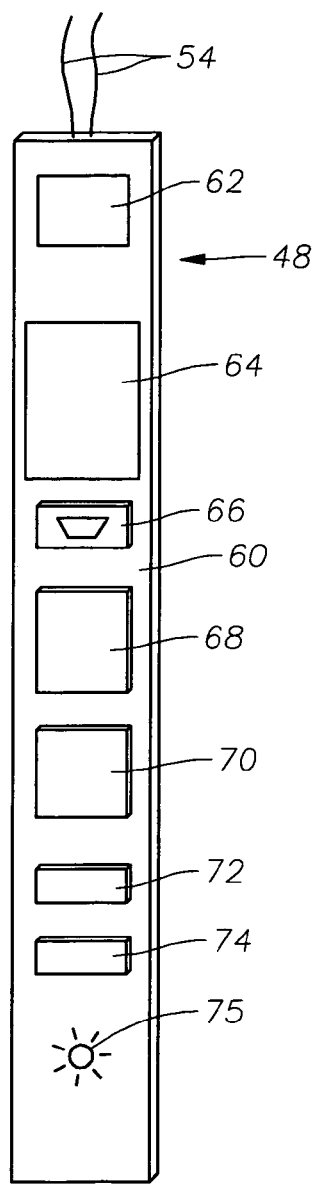
FIG. 3 illustrates one layout for an exemplary printed circuit board assembly used in the electronics package.

FIG. 1 illustrates an example of use of the impact sensing system of the present invention. FIG. 1 depicts a portion of an exemplary wellbore 10 that has been drilled through the earth 12. The wellbore 10 has been lined by metallic casing 14 backed by cement 16. The casing 14 contains a locking profile 18. A plug or lock 20 has been previously secured within the casing 14 by means of locking lugs 22 that have been extended outwardly into the profile 18.

As it is now desired to remove the lock 20 from the wellbore 10, a pulling tool assembly 24 has been run into the wellbore 10 by wireline cable 26. The pulling tool assembly 24 includes a weight bar 28 and a hydraulic impact jar sub 30. At its lower end, the hydraulic impact jar sub 30 is secured to a mechanical spang jar 32. An impact sensing sub 34, in accordance with the present invention, is secured to the lower end of the spang jar. The lower end of the impact sensing sub 34 is secured to a pulling tool 36, of a type known in the art for latchably securing to a fishing neck 38 of lock 20.

In operation to remove the lock 20 from the wellbore 10, the hydraulic impact jar sub 30 is actuated to cause the spang jar 32 to impart impact loads to the pulling tool 36 to dislodge the lock 20. As this type of jarring or pulling operation is known in the art, it is not described in any further detail herein. Because the impact sensing sub 34 is located proximate the spang jar 32, and preferably between the spang jar 32 and the pulling tool 36, the impact sensing sub 34 is able to record data relating to the jarring operation, as will be described in more detail shortly. The impact sensing sub 34 serves as the downhole component of the impact sensing system of the present invention.

FIG. 2 shows a side view of an exemplary impact sensing sub 34, which includes an outer housing 40 having threaded end connections 42, 44. While many different types of connections may be utilized, for convenience purposes and compatibility with other oilfield service tools, a 1 9/16 inch straight V thread may be utilized. The housing 40 is made up of an upper sub 39 and a lower sub 41, which are threadedly secured together. An interior chamber 46 is defined within the upper sub 39. The outer diameter of the housing should be sized to be compatible with standard wireline and coiled tubing diameters currently available and utilized in the industry today and to be easily recoverable by standard oilfield fishing tools. Outside diameters of 1.500", 1.750", 1.875 and 2.500" inches are currently preferred. Because conventional wireline sinker bars are manufactured in 2, 3 and 5 foot lengths, and diameters of 1½ inch, 1⅞ inch, and 2½ inch, the housing 40 may be manufactured from sinker bars of these dimensions. As an alternative embodiment, the housing 40 may comprise a coiled tubing sub, where the electronics package is configured to be mounted "in the wall" of the sub, so as to allow a full open internal diameter of the coiled tubing.

Because the housing 40 and the lower 'neck down' sensor sub and upper pin thread connection will be bearing the actual impact forces it should have sufficient mechanical properties to safely bear this load. A yield strength of 120,000 pounds per square inch is acceptable, and a collapse strength of 30,000 pounds per square inch is preferred. Suitable materials for construction of the housing 40 include various high strength alloys suitable for high temperature and corrosive service, such as Inconel 718. However, standard wireline toolstrings generally utilize 4130 heat treated material and as such this will be the common materials used to be consistent with standard wireline and coiled tubing toolstrings and to prevent galvanic corrosion of opposing materials that could ultimately result in fatigue failure of the entire toolstring downhole. When the housing 40 is manufactured according to the preceding description, the system does not impact the structural strength of the tool string. Any seals, plastics or elastomers used in the carrier should be adapted for a hostile, high temperature and corrosive environment. These types of materials are known and include VITON, polyetheretherkeytone ("PEEK"), Nitrile and Therban.

As depicted in FIG. 2, the chamber 46 of the upper sub 39 contains a printed circuit board assembly (PCBA) 48 that is secured by mounting brackets 50 to the interior of the chamber 46. Batteries 52 are secured separately to another portion of the interior of the chamber 46. Each battery 52 may be a lithium battery having a voltage of 3.2 to 6.0 VCC. It is highly preferred that the batteries 52 not be directly attached to or even in contact with the PCBA 48 in order to prevent the weight and inertia associated with the batteries 52 from interfering with readings made by the PCBA 48. The batteries 52 preferably use minimal lithium content in order to aid transportation on aircraft where lithium content is a 'IATA' hazardous material issue. By utilizing low content lithium systems below 1.0 grams total the system will be hazard-free shipping goods. The batteries 52 are separated from the PCBA 48 in order to maintain reliability of both the batteries 52 and the PCBA 48. In the event the PCBA 48 fails to operate, it will not affect the operation of the batteries 52. Similarly if the battery pack 52 fails it will not affect the operation of the PCBA 48 and can be changed out independent of the batteries 52. This also allows the electronics package to be shipped separately from the battery pack where Lithium content is a freight flight issue. The system will typically function up to 12 months without service; however this is determined by how much usage the system is exposed to. Wire leads 54 extend from the batteries 52 to the PCBA 48 to supply power to the electronic components of the PCBA 48. Additional wire leads 56 extend from the PCBA 48 to socket 58. The socket 58 is used for interconnection of the surface components after the downhole components have been removed from the wellbore 10.

FIG. 3 illustrates an exemplary layout for the PCBA 48. As shown, the PCBA includes a substrate board 60 which carries an inclinometer 62, a vibration sensor 64, pressure sensor 66, temperature sensor 68, memory storage chip 70, microprocessor 72, and real time clock 74. Additionally, an LED (light-emitting diode) 75 is preferably placed on the PCBA 48 and is turned on by the microprocessor when the electronics package is in an active mode. Programming of the microprocessor 72 to accomplish this will be understood by those of skill in the art.

The lower sub 41 also defines an interior chamber 76 within. Strain gauges 78 are affixed to the interior wall of the chamber 76. The strain gauges 78 are suitable to measure strain upon the housing 40 during jarring operations. The strain gauges 78 are operably interconnected with the PCBA 48 by means of wire leads 80.

Figure 4:
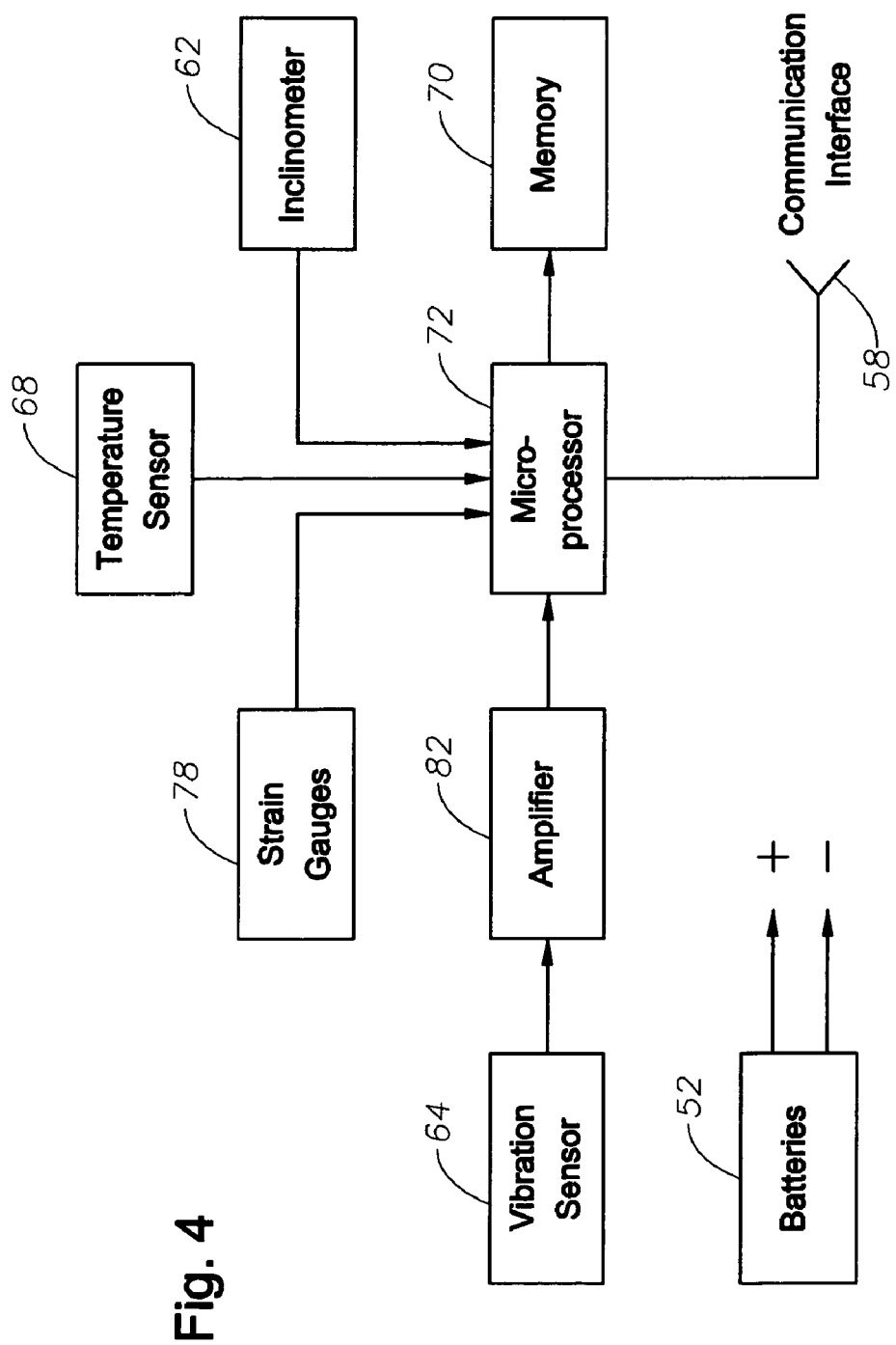
FIG. 4 shows a schematic of the downhole electronics for one embodiment of the device.

FIG. 4 schematically illustrates the general operation of the electronics package within the impact sensor sub 34. The vibration sensor 64 detects vibratory movement of the sub 34, which would typically occur during the initiation of a jarring operation, and generates an analog signal representative of such movement. A signal amplifier 82 amplifies the signal from the vibration sensor 64 and inputs the signal to the microprocessor 72, which transforms the analog signal to a digital signal, and indicates to the microprocessor 72 that the tool is to begin operation, as further described below. The strain gauges 78 detect strains on the housing 40 during impacts from the spang jar 32 and transmit the data to the microprocessor 72, which then records the data on the memory 70. Each time an impact event occurs the PCBA system is programmed to capture a temperature and angle reading. The temperature sensor 68 and inclinometer 62 transmit sensed data to the microprocessor 72, which records the sensed data in the memory 70. The real time clock 74 transmits time data to the microprocessor 72 so that the readings from the strain gauges 78 are "time stamped" or correlated with a particular time. The pressure sensor 66 also provides sensed pressure data to the microprocessor 72, and this data is then recorded in the memory 70. By only allowing readings to take place during impact events this will prolong battery life and permit the system to perform for the specified 12 month minimum period for operations. The components of the electronics package are shock mounted within the carrier 10 in such as manner that the electronics package can measure impact yet not be damaged as a result of the impact. The microprocessor 72 is programmed so that, each time an impact occurs, it will capture a reading from the strain gauges 78, inclinometer 62, and real time clock 74 and correlate them into a record.

The microprocessor 72 is typically programmed before being run into a well with a single program button. This removes the need for trained personnel to operate the tool. The vibration sensor 64 will perform the following functions in order for acquiring only the required data and 'Not' acquiring all data. The vibration sensor 64 will keep the PCBA circuit in the sleep mode until a 'quiet' time elapse period has been received by the vibration sensor 64. This elapse time can be programmable by the operator prior to installation into the wellbore. Once the vibration sensor 64 has seen a pre-programmed 'quiet' period the vibration sensor will then activate the PCBA circuit to a mode known as 'Arm mode', this mode is the second stage of the operations sequence. At this point the vibration sensor 64 is programmed to look for vibration. Once vibration is sensed (by the jars opening or closing to perform an impact) the vibration sensor will put the PCBA circuit into the 'Active' mode ready to receive the impact. The 'Active mode will be a time period that will be opened to allow impact data to be recorded and stored. Once the recording time has elapsed the tool will return to a sleep mode and will be kept in a permanent sleep mode until the vibration sensor again sees a pre-programmed 'quiet' time thereby setting the cycle in motion again. This feature saves battery life and also prevents the recording of unnecessary data onto the memory 70. The particular steps for programming the microprocessor 72 with this "sleep" feature will be understood by those of skill in the art. The memory means 70 will typically have a capacity of 100,000 records or more, however even when the memory 70 is full the tool will continue to take data and record and time stamp all information due to a programmed firmware routine that will erase the earliest recorded data and numerically every event after the earliest, thereby allowing the memory chip 70 to be continually utilized and never have the requirement to 'dump' or 'erase' a full memory due to data overload.

Figure 5:
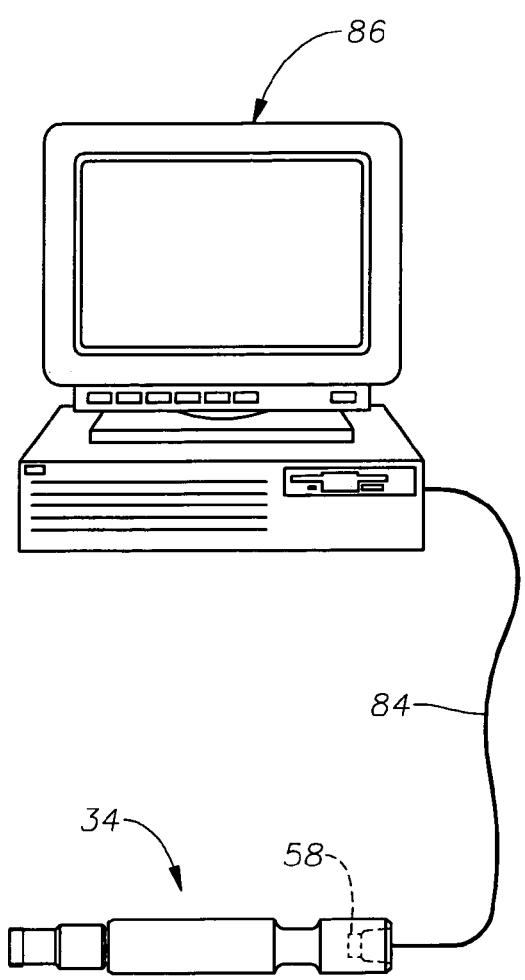
FIG. 5 illustrates components of an embodiment of disclosed device.

FIG. 5 shows some of the downhole components and surface components of an embodiment of the disclosed apparatus. As shown in FIG. 5, impact sensor sub 34 has been withdrawn from the wellbore 10 and has been disconnected from the other portions of the pulling tool assembly 24. A connecting cable 84 is used to connect the socket 58 of the impact sensing sub 34 to processing device 86, which may be a computer. Communication may be through known connectors such as RS-232 serial connectors or USB connectors. The processing device 86 accesses the data through Windows® compatible software and offloads it to the processing device 86. In other embodiments, a wireless interface, such as infrared, may be used.

The processing device 86 is the surface component that acquires the data from the downhole component and allows the data to be presented as desired (i.e., displayed on-screen, printed out, etc. The acquired data enables the operator to analyze events which have occurred below the surface according to the impacts observed downhole according to the time at which the impacts occurred. This data can be correlated with the data observed at the surface, such as weight indications, to ascertain the extent the operations conducted at the surface are impacting the downhole operation. The values observed by the downhole component may be printed out in engineering units along with a time stamp to correlate the event time. For example, if the operator is conducting fishing operations with wireline or coiled tubing without successfully recovering the fish, the operator may ascertain how much force is being transmitted downhole to the fish as compared to the force observed at the surface on the weight indicator. From this data, the operator may determine that because of well deviation, insufficient force is being transmitted downhole and the operator may modify the operation accordingly, such as modifying the tool string or applying additional force at the surface. The built-in inclinometer 62 will allow the operator to determine if the well deviation is causing insufficient force at the device. It is to be appreciated that the downhole component may be run in conjunction with other diagnostic types of devices, such as downhole pressure and temperature recorders but should have impact or shock absorption included to ensure survivability of the pressure and temperature gauges.

Data from the electronics package may be displayed in the form of a graph showing impact events on one axis with time plotted on a second axis, temperature on a third and pressure on a fourth. Actual engineering data will be shown in a menu window on the surface PC system for accurate and detailed data numbers. A fifth axis showing wellbore angle by means of an inclinometer may be implemented to enable the operator to view not only the impact downhole but also at what deviation the impact occurred. Without knowledge of impact angle it might be difficult to determine how to adapt a secondary toolstring to accommodate the results taken from the impact event.

Those of skill in the art will recognize that numerous modifications and changes may be made to the exemplary designs and embodiments described herein and that the invention is limited only by the claims that follow and any equivalents thereof.

What is claimed is:

1. An impact sensing system for use within a wellbore comprising:
    a housing for incorporation into a tool string to be run into the wellbore; and
    an electronics package associated with the housing to detect and record information relating to impacts within the tool string proximate the housing.

2. The system of claim 1 wherein the electronics package comprises:
    an impact sensor operably associated with the housing to detect strains upon the housing from said impacts and generate a signal indicative said impacts;
    a microprocessor operably associated with the impact sensor to receive the signal; and
    a storage memory for recording data from the microprocessor indicative of detected impacts.

3. The system of claim 2 wherein the impact sensor comprises a strain gauge.

4. The system of claim 2 further comprising a clock operably associated with the microprocessor to provide time correlation of detected impacts.

5. The system of claim 2 wherein the electronics package further comprises a temperature sensor for detection of temperature within the wellbore.

6. The system of claim 2 wherein the electronics package further comprises a pressure sensor for detection of pressure within the wellbore.

7. The system of claim 2 wherein the electronics package further comprises an inclinometer for measuring an angle of inclination for the housing during said impacts, the inclinometer providing to the microprocessor measurements of said angle of inclination.

8. The system of claim 2 wherein:
    the electronics package further comprises a vibration sensor operably associated with the microprocessor for detecting vibration of the housing and providing a signal indicative of said vibration to the microprocessor; and
    the microprocessor is programmed to be inactive during periods in which there is no signal indicative of vibration and to become active upon receipt of a signal indicative of vibration.

9. The system of claim 1 further comprising a power source for the electronics package and wherein the power source is mounted within the housing so that it is not in contact with the electronics package.

10. An apparatus comprising:
    an impact sensing sub comprising an electronics package, said impact sensing sub adapted to be deployed into a wellbore;
    said electronics package comprising data storage means;
    said electronics package being capable of measuring impact forces on said impact sensing sub and storing data related to the impact forces using said data storage means;
    a surface component capable of retrieving said data stored in said data storage means; and
    said surface component being capable of presenting said data to an operator for analyzing well bore conditions.

11. The apparatus of claim 10 wherein the electronics package further comprises a strain gauge for detecting strains upon the impact sensing sub associated with said impacts.

12. The apparatus of claim 11 wherein the electronics package further comprises a clock operably associated with the microprocessor to provide time correlation of detected impacts.

13. The apparatus of claim 10 wherein the surface component comprises a computer.

14. The apparatus of claim 10 wherein the electronics package includes a strain gauge sensor for measurement of strain associated with the impacts.

15. A method comprising:
    deploying an impact sensing sub comprising an electronics package into a wellbore, said electronics package comprising data storage means;
    measuring impact forces on said impact sensing sub using said electronics package;
    storing data related to the impact forces using said data storage means;
    retrieving said data stored in said data storage means using a surface component; and
    presenting said data to an operator for analyzing wellbore conditions.

16. The method of claim 15 further comprising the step of correlating measured impact forces with time.

17. The method of claim 15 further comprising the step of measuring inclination of the impact sensing sub and correlating measured inclination with measured impact forces.

18. The method of claim 15 wherein the step of measuring impact forces further comprises detecting said impact forces by a strain gauge associated with the impact sensing sub.

19. The method of claim 15 wherein the step of retrieving data stored in the data storage means comprises transferring said data to a computer.

20. The method of claim 15 further comprising the step of detecting temperature proximate the impact sensing sub.

* * * * *